United States Patent [19]

Zapata Martinez

[11] 4,236,866

[45] Dec. 2, 1980

[54] SYSTEM FOR THE OBTAINMENT AND THE REGULATION OF ENERGY STARTING FROM AIR, SEA AND RIVER CURRENTS

[76] Inventor: Valentin Zapata Martinez, No. 3 Lerida St., Madrid, Spain, 20

[21] Appl. No.: 764,998

[22] Filed: Feb. 2, 1977

[30] Foreign Application Priority Data

Dec. 13, 1976 [ES] Spain ................... 454.192

[51] Int. Cl.³ ........................... F03D 3/04
[52] U.S. Cl. ..................... 415/2 R; 415/64; 416/126
[58] Field of Search ..................... 415/2-4, 415/64, DIG. 8; 416/126, 197 A

[56] References Cited

U.S. PATENT DOCUMENTS

| | | | |
|---|---|---|---|
| 372,148 | 10/1887 | Henderson | 415/4 |
| 471,951 | 3/1892 | Choate | 416/126 |
| 1,100,332 | 6/1914 | Smith | 416/197 A |
| 1,463,924 | 8/1923 | Ozaki | 415/2 R |
| 1,519,447 | 12/1924 | Fortier-Beaulieu | 415/2 R |
| 1,645,855 | 10/1927 | DeVore | 415/64 |
| 3,048,006 | 8/1962 | Goodman | 60/641 |
| 4,018,543 | 4/1977 | Carson et al. | 290/55 X |
| 4,070,131 | 1/1978 | Yen | 290/55 X |

FOREIGN PATENT DOCUMENTS

| | | | |
|---|---|---|---|
| 729533 | 12/1942 | Fed. Rep. of Germany | 415/4 |
| 369199 | 11/1906 | France | 60/641 |
| 508815 | 10/1920 | France | 415/2 R |
| 576980 | 8/1924 | France | 415/2 R |
| 53594 | 11/1921 | Sweden | 415/2 |
| 97500 | 1/1923 | Switzerland | 415/2 |
| 185939 | 9/1922 | United Kingdom | 415/3 |
| 188653 | 3/1923 | United Kingdom | 415/3 |
| 542016 | 3/1977 | U.S.S.R. | 415/2 R |

*Primary Examiner*—Everette A. Powell, Jr.
*Attorney, Agent, or Firm*—Wenderoth, Lind & Ponack

[57] ABSTRACT

A system for obtaining and regulating energy from the air or sea and river currents includes a cyclone converter formed by three concentric rotating bodies, either on shafts or cylindrical rails or the like. Fixed rollers or other electromagnetic systems permit the rotation of the group around an imaginary or actual geometrical shaft. The outside body is self-orientating with its main components and deflectors on rotating components or a base sliding rail. The intermediate concentric body or turbine is formed by rings and vanes and a system of rollers or electro-magnetic supports which are inside or outside the turbine. The inside body or diffuser rotates concentrically in a reverse direction to the turbine and has vanes of opposite complementary angles.

5 Claims, 26 Drawing Figures

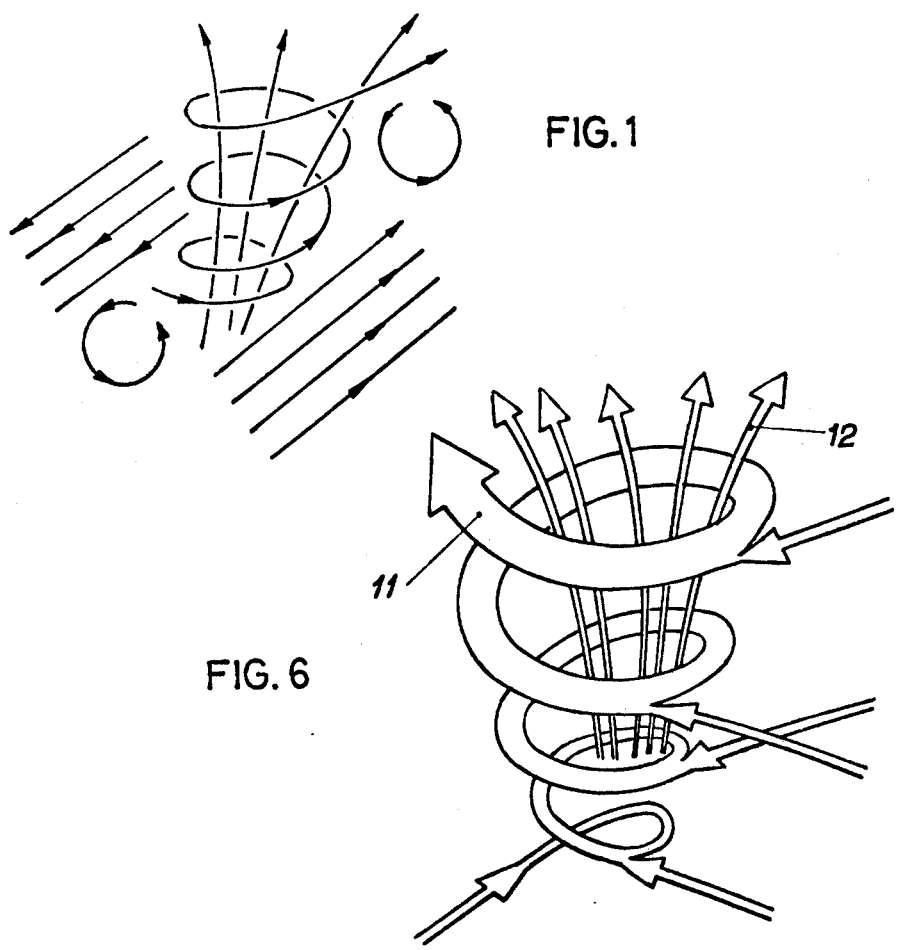
FIG. 1
FIG. 6
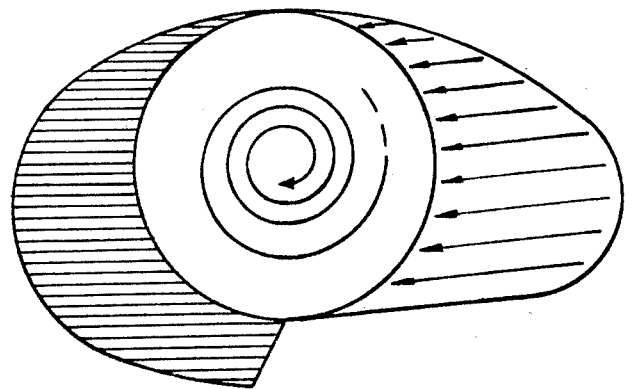
FIG. 15

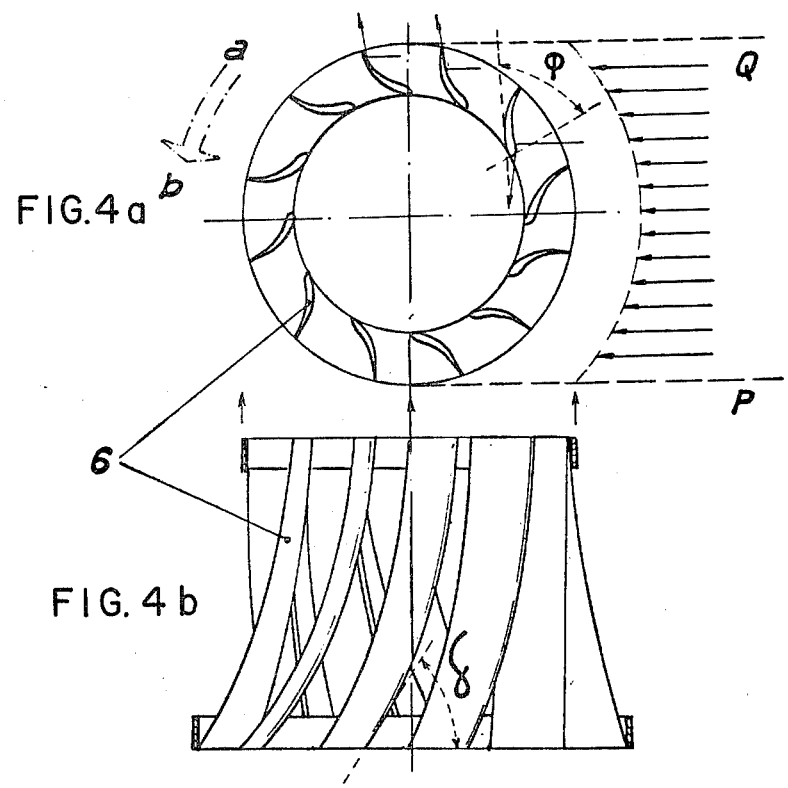
FIG. 4a
FIG. 4b
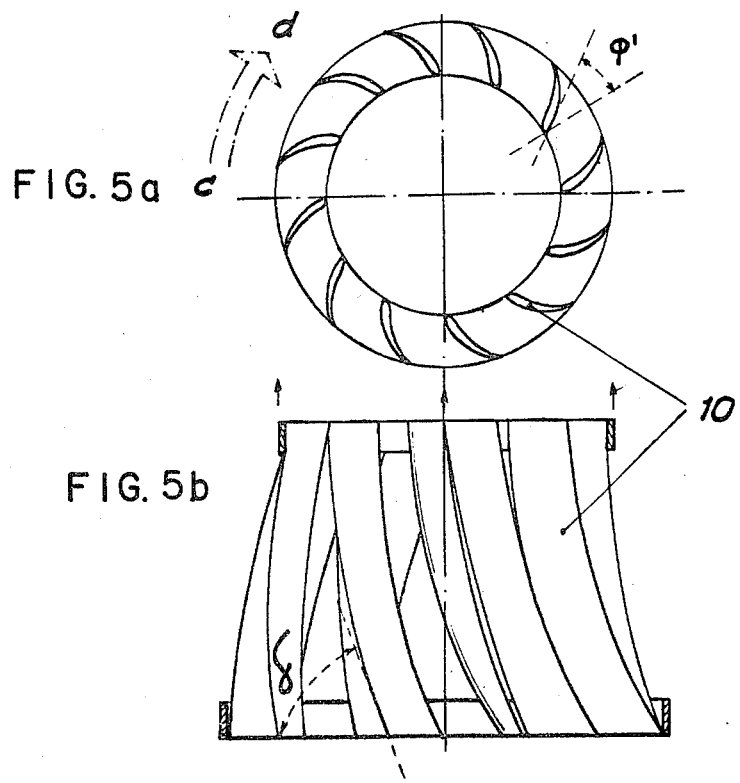
FIG. 5a
FIG. 5b

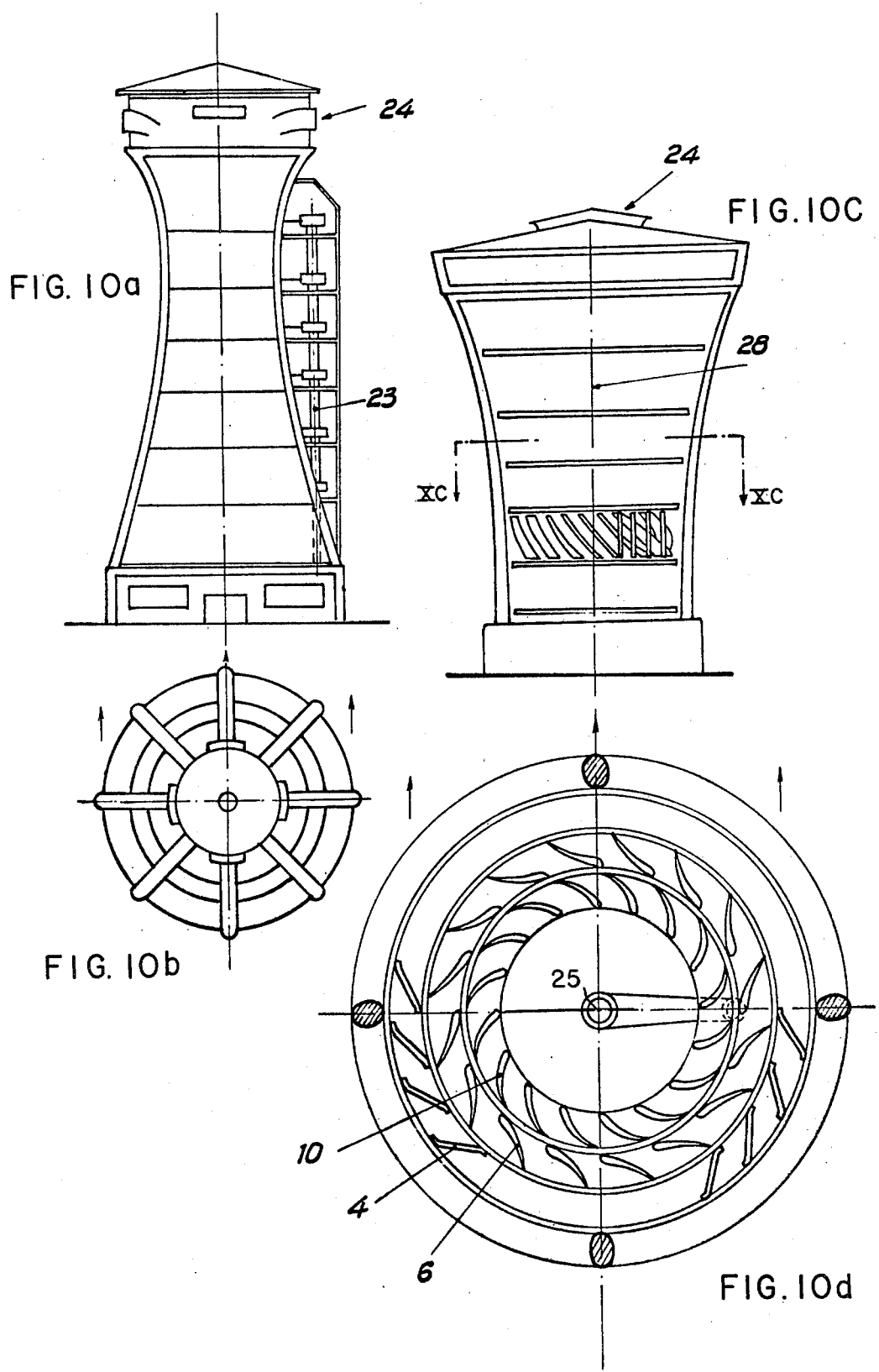

SYSTEM FOR THE OBTAINMENT AND THE REGULATION OF ENERGY STARTING FROM AIR, SEA AND RIVER CURRENTS

BACKGROUND OF THE INVENTION

The invention is directed to the use of the natural energy of fluids, such as air, wind, tides, the supply of which fluids is infinite and inexhaustible. As an example, it is possible to employ the Humboldt current, the Gulf Stream current, or trade winds.

The present invention provides a system for obtaining and regulating energy from such currents.

As an example which is not intended to be limiting, air (the wind) may be expressed as a fluid, although the invention may be applied to any fluid that moves. Wind however will be utilized to illustrate the invention.

When currents exist, then in the contact borders of the masses in movement, force couples are produced that originate rotational movements. In air, the rotation movement is generated in the borders of currents which have different velocities, with different directions and senses, and, in a like manner, by ascending displacement of air masses.

The enormous energy of hurricanes and cyclones is known.

In known systems for the capture of the energy of the wind, the concept of physico-mechanical limitations have prevented the capture "without any limitations whatsoever" of the total energy of air currents.

SUMMARY OF THE INVENTION

The system of the invention described hereunder makes it possible to obtain all the energy of air currents at any height and situation with maximum performance, to faciliate the storage of the energy surpluses either by pumping water from lower levels to higher levels or by applying electrical energy obtained from the separation, by hydrolysis, of hydrogen from the water into larger tanks in order to burn the hydrogen at will in accordance with need, to produce water and heat to feed a steam power station which produces electrical energy which is regulated. In a like manner, if the regulation is hydraulic, the system permits the liberation of the flows of rain water. In addition, the system permits a drastic reduction of the construction costs of dams for the production of electrical energy.

Among many other numerous advantages, the system makes possible the full utilization without any limitations whatsoever, of all the power installed in great dams, since the system makes independent the production of energy from the consumption of the water stored.

In this case, surplus water may be supplied not only upstream but also downstream of the dams, for the new irrigation of land which previously would not have been productive.

The system, therefore, in this hydraulic version permits the extraction of water, without any limits whatsoever, from subsurface levels in desert zones, as the system produces energy at the point of consumption, or produces potable water in the version regulated by hydrolysis of the water from the sea and the storage of hydrogen.

BRIEF DESCRIPTION OF THE DRAWINGS

Other features of the invention will be apparent from the following description, taken with the accompanying drawings, wherein:

FIG. 1 is a sketch illustrating force couples which originate rotation movement of the device of the invention;

FIGS. 4a and 4b are plan and elevation views of the outer turbine of the converter of the invention;

FIGS. 5a and 5b are plan and elevation views of the inner diffuser of the converter of the invention;

FIG. 6 is a sketch illustrating the circulation of an air vortex in the converter tower of the invention;

FIGS. 10a and 10b are elevation and plan views of a wind tower including plural converters according to the invention;

FIGS. 10c and 10d are an elevation view and a section along line Xd—Xd of FIG. 10c, respectively, of another wind tower according to the invention;

FIG. 15 is a diagram illustrating pressures existing in a horizontal section through the device of the invention.

DETAILED DESCRIPTION OF THE INVENTION

In accordance with the invention, when there exist currents, parallel or not, of fluids, then force couples are produced which originate rotational movements as shown in FIG. 1.

Figure 2:
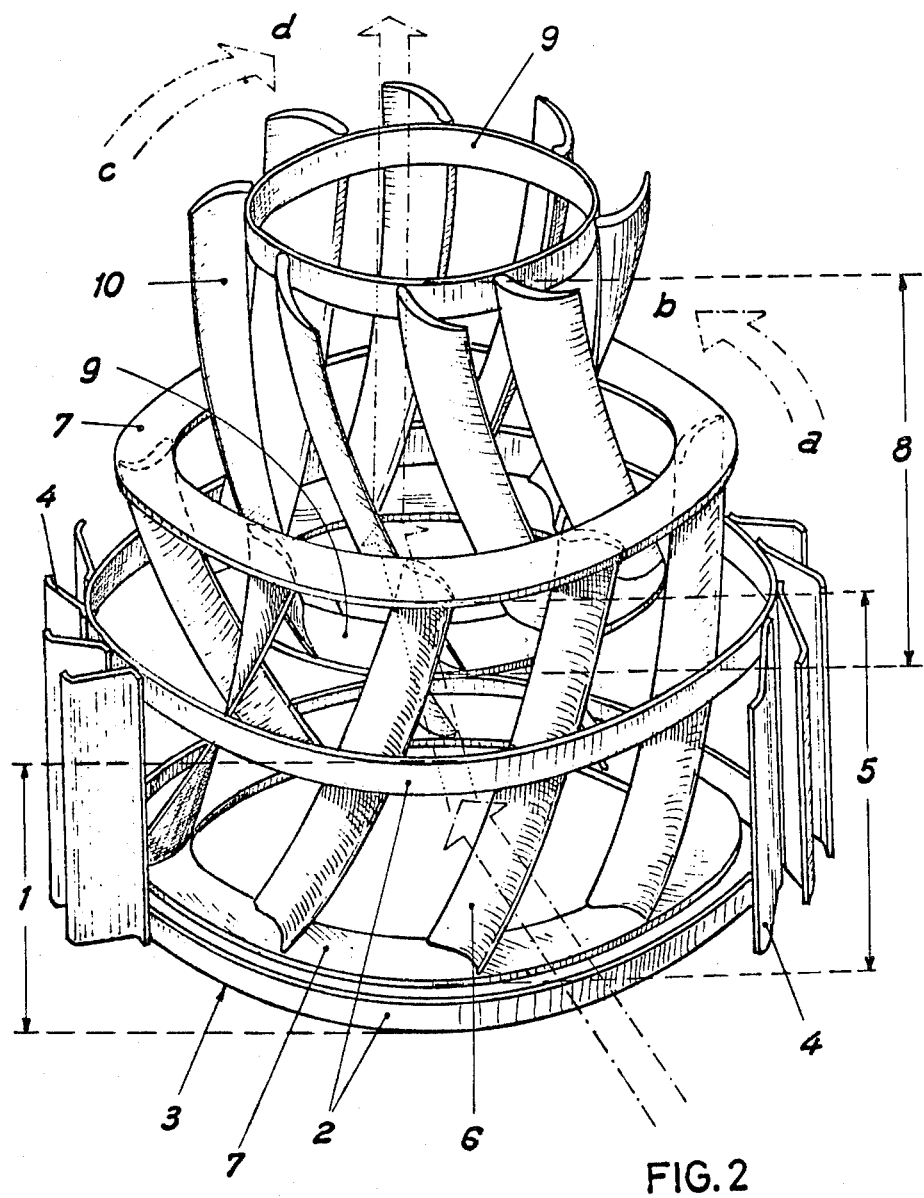
FIG. 2 is a perspective view of the power converter of the invention.

The converter of the invention includes three bodies of revolution which rotate on shafts or circular rails and which includes, as shown in FIG. 2, an outside body or deflector 1 which is self-orientating with respect to the fluid flow. Deflector 1 includes rings 2 of a variable shape, for example, cylindrical, conical, etc., which slide on supported rotating guides 3 (FIG. 7) and which are joined by two groups of fins or vanes 4 with nonparallel angles of deflection.

Figure 3A:
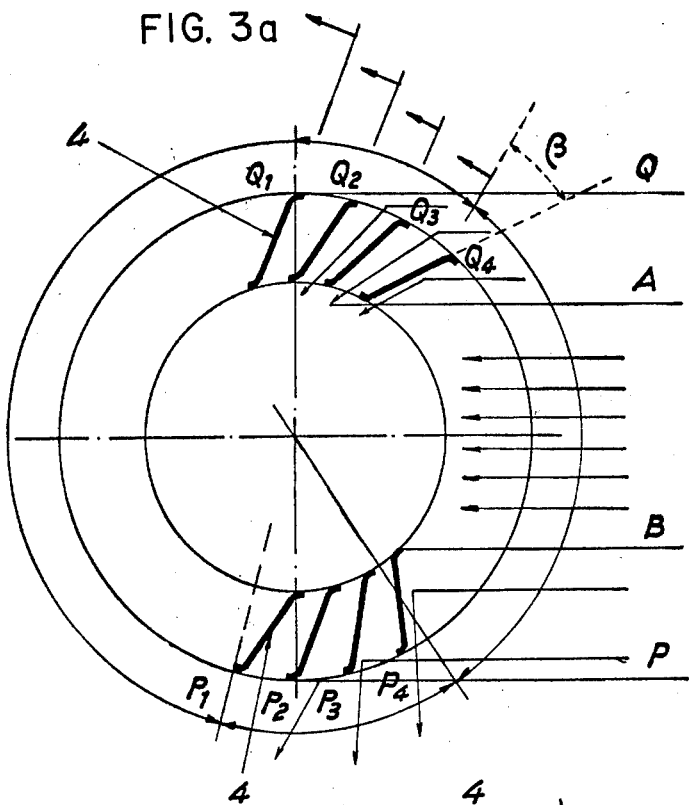
FIGS. 3a and 3b are schematic views illustrating the manner in which the deflector of the invention may be oriented.

The flow of the fluid, such as wind, causes, as shown in FIG. 3a, force couples AQ and BP, which are of equal magnitude acting in parallel but opposite directions, and are capable of causing rotation but not translation, to thus balance the rotational position of deflector 1.

Figure 3B:
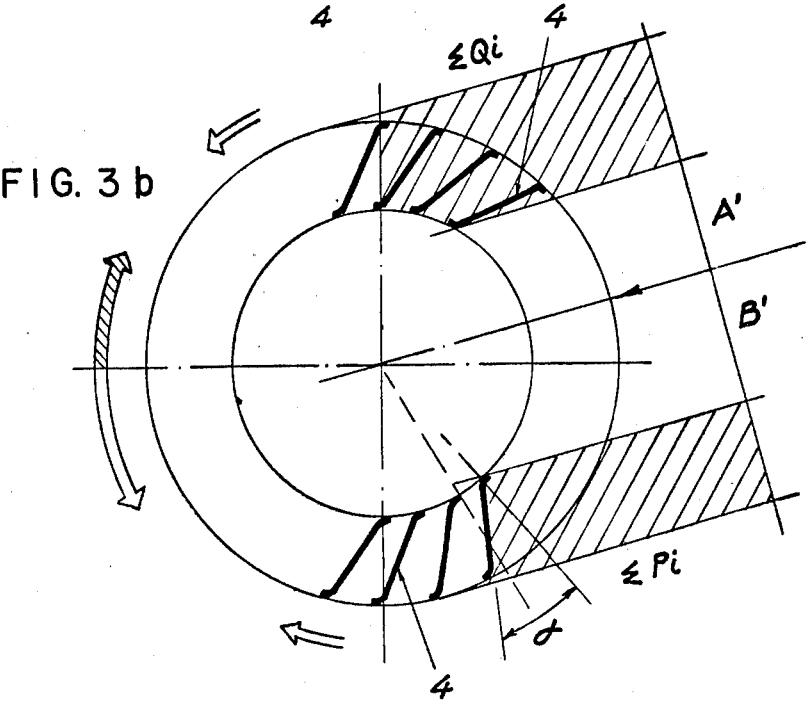

Any sudden change in the direction of the wind, such as A'B' in FIG. 3b, causes an automatic rotational movement of the deflector 1 which is thereby self-orientating and locates itself centered with respect to the direction of the air current.

Thus, the air that enters the intermediate body or turbine 5 between AB in FIG. 3 and the air Q which is deflected by one of the groups of deflectors, is directed onto the vanes 6 (FIG. 2) of the turbine 5 formed by two components or revolution rings 7 joined by vanes 6 which form different angles with respect to the vertical plane and the horizontal plane, as shown in FIGS. 4a and 4b.

The entire air in the current AB (FIG. 3a) enters in a direct manner into the turbine 5, thus cancelling by deflection the current P (FIG. 3a) and making the best use of the deflected current Q (FIG. 3a).

As may be observed in FIG. 2, the air as it is directed onto the vanes 6, which are shaped having both varying vertical and horizontal angular orienation, of the turbine 5 is directed in a tangential manner towards the interior and upwardly, thus causing rotation in the direction ab in FIG. 4a of the turbine 5. Thus, the air current may circulate between the vanes 6 without any impediment other than that presented by the necessary fastening arms if the supporting structure is an interior shaft (FIG. 7), or by the bearing structure if the rotation is outside of the structure (FIG. 11).

Concentrically within turbine 5 of the converter (FIG. 2), there is arranged a diffuser 8 formed by two components or rings 9 joined by vanes 10, the inclination of which, with respect to the horizontal and vertical planes, is approximately opposite to that of the turbine 5 (FIGS. 5a and 5b).

The flow from the turbine 5 is directed onto the vanes 10 of the diffuser 8 and is a again deviated towards the interior in a tangential manner and in an upward direction, thus causing the rotation of the diffuser 8 in the direction cd shown in FIG. 5a.

Having vertically arranged a desired number of converter groups (FIG. 2), including deflector 1, turbine 5 and diffuser 8, there is created a rising rotational flow without any limitation other than the physical support of the system.

Thus, each converter group includes a deflector 1, a turbine 5 and a diffuser 8 which may be supported by a common inside shaft, an independent inside shaft, a common outside shaft, or an independent outside shaft.

Each converter group may further be provided with a shaft or without a shaft, with guides or rails on an inside or outside bearing structure, with an outside or inside internal transmission shaft, or with a support or magnetic guides without a rolling system, with rollers, sliding wheels or any other means that will guarantee concentric rotation.

The converter groups may be arranged in energetic towers (without any limitation on height) of five hundred or more meters in height, either in coastal zones or mountain zones. Such towers may capture, for velocities of an average of twenty-five Km per hour (normal speed), depending on the tower, between 75,000 and 220,000 Kilowatts hour per tower. The system, under these conditions, makes the best use of the totality of the energy content of the wind, while making the best use of the negative action of the flow in the posterior zone of the turbine. Thus, there is provided an efficient arrangement which is aesthetic and which may be integrated into the landscape.

The circulation of the vortex inside the converter tower is represented in FIG. 6 which illustrates how, on making the best use of the currents with independence of the height and the direction in a simultaneous manner, a cyclone effect is created.

Figure 7:
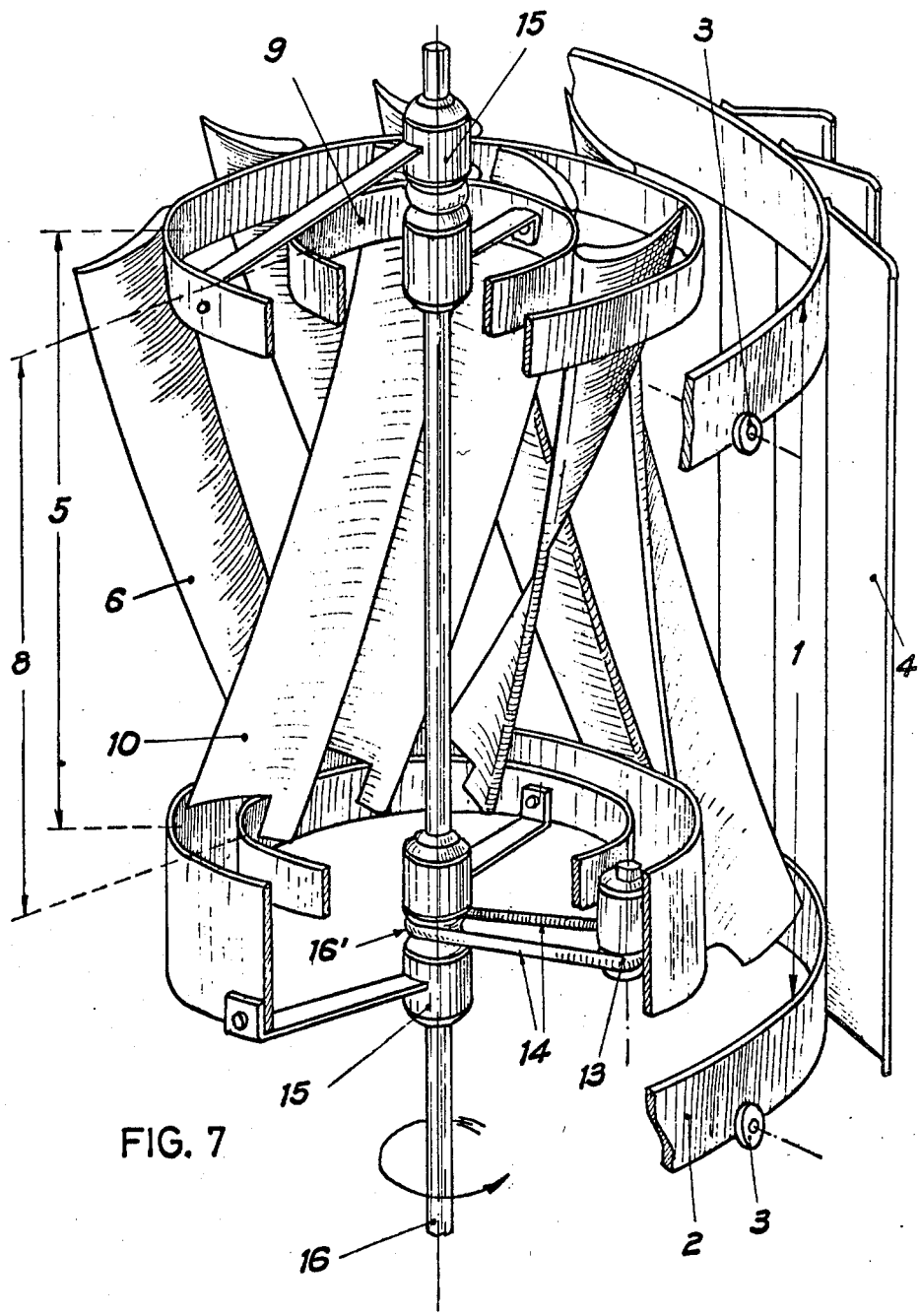
FIG. 7 is a perspective view, with portions broken away, of a converter including an arrangement with a central shaft and a power intake.

In FIG. 7 there is illustrated an arrangement of a central shaft converter including a power intake 13 and belts 14, as well as loose bearings 15 and pulleys 16 anchored to a center shaft 16. Thus, power is transmitted to the power shaft.

Figure 8:
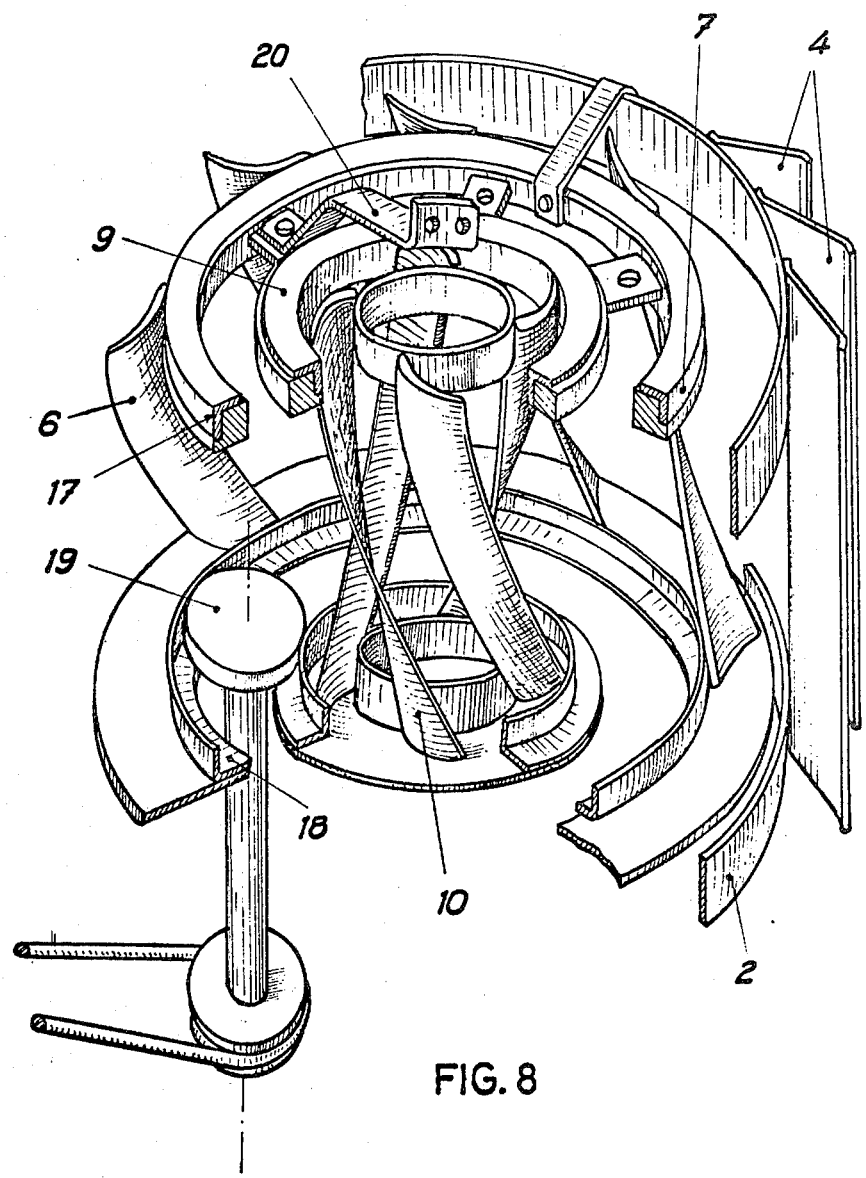
FIG. 8 is a perspective view, with portions broken away, of a converter including a power intake with electromagnetic rails without any rollers or wheels.
Figure 8A:
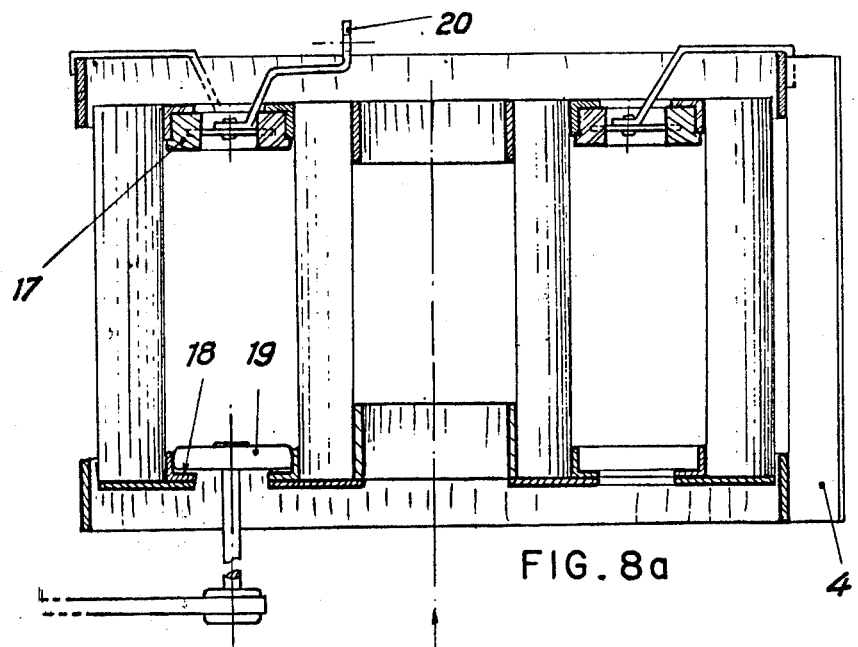
FIGS. 8a and 8b are an axial sectional view and a plan view of the converter of FIG. 8.
Figure 8B:
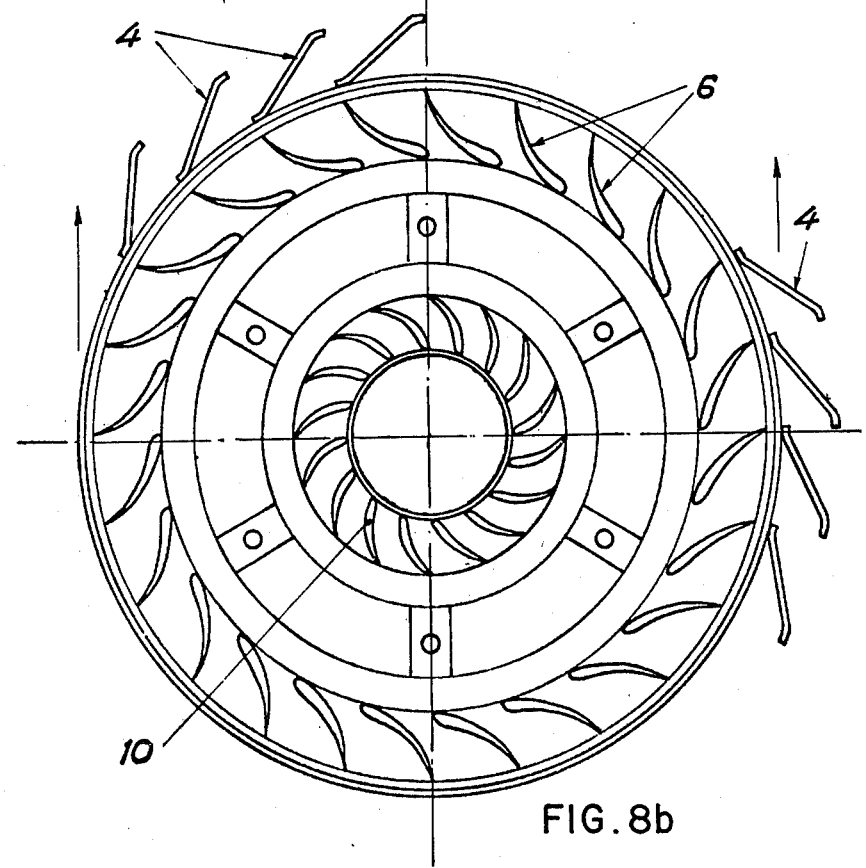

FIGS. 8, 8a and 8show an orientative arrangement of the converter whose rotation takes place without any friction on electro-magnetic repulsion rails 17. The flywheels 18 transmit the rotation of the converter through the roller 19 to a hypothetical generator by means of belts. This electrical generator, alternator or dynamo carries with it a magnetic hydraulic speed regulator such as in known in the open market. The group in itself is equipped with supports 20.

Figure 9A:
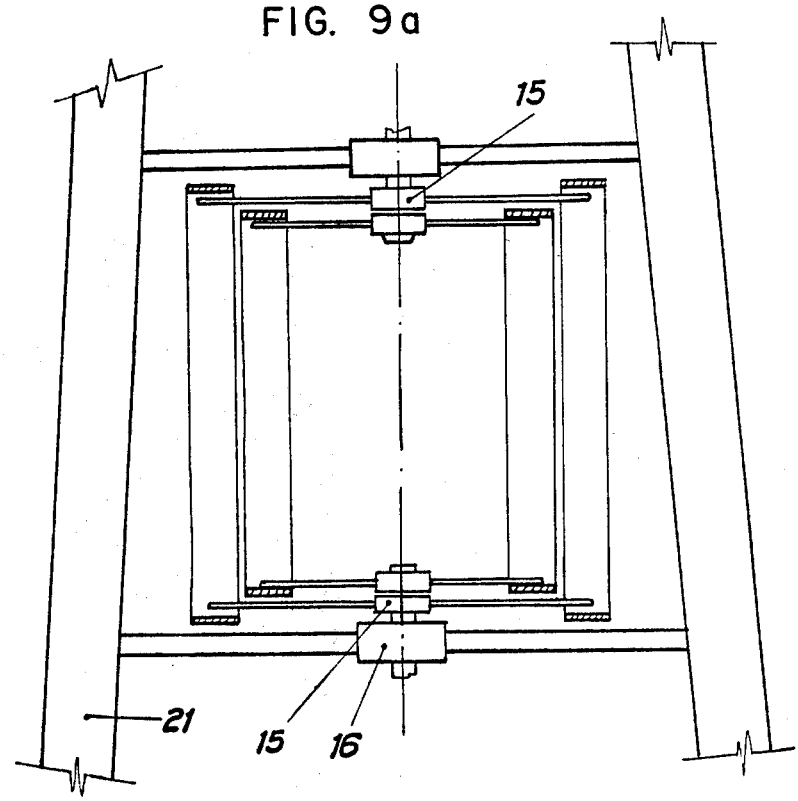
FIGS. 9a and 9b are an axial sectional view and a partial horizontal sectional view of a polystage tower having independent components, and equipped with direct generation on each step by direct coupling to a generator (dynamo) or an alternator.
Figure 9B:
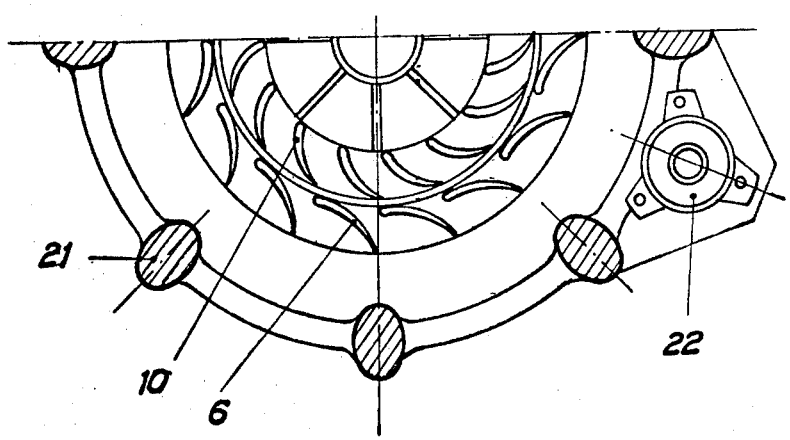
Figure 11A:
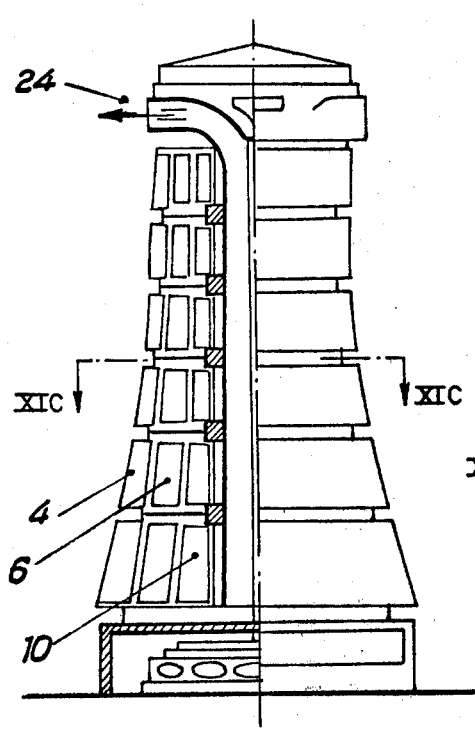
FIGS. 11a and 11b are elevation views, partially in section, of other wind towers according to the invention.
Figure 11B:
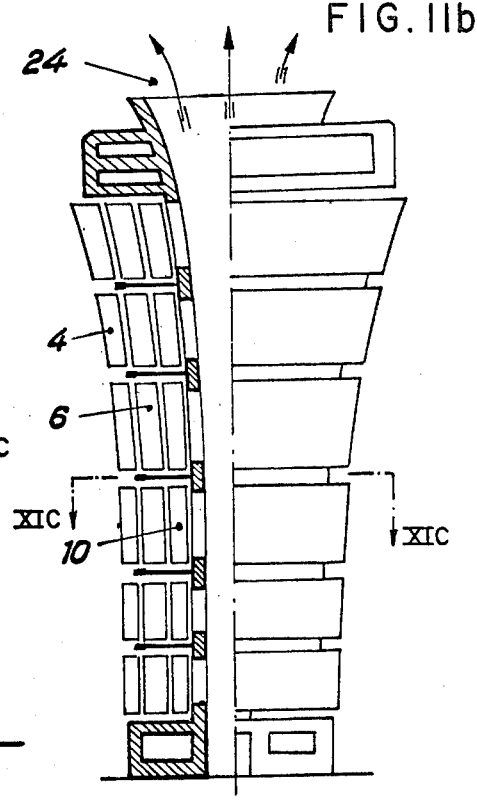
Figure 11C:
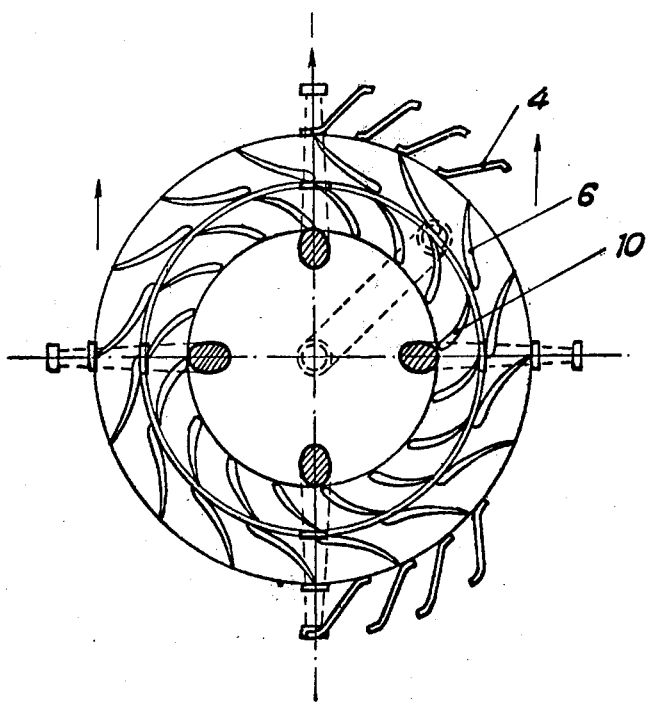
FIG. 11c is a schematic cross-section taken approximately along line XIc—XIc in FIGS. 11a or 11b.

In FIGS. 9a and 9b there is shown an arrangement of a polystage or plural floor tower of independent components with direct generation of each floor. The tower includes metallic or concrete pillars 21 and an alternator or dynamo (generator) 22 with a built-in speed variator. The towers can have various forms of construction of the revolution shaft, as is indicated in the examples represented in FIGS. 10a, 10b, 10c, 10d, 11a, 11b, 11c and 12. Thus, FIGS. 10a and 10b show a tower with an outside common shaft 23 and evacuators 24 for the surplus air outlet, and FIGS. 10c and 10d show a tower with an inside common shaft 25 and evacuators 24 in a different position but also for the outlet of surplus air. In FIGS. 11a, 11b and 11c there is shown the location of the vanes 10 of the diffuser 8, vanes 6 of the turbine 5, and the vanes 4 of the deflector 1, and also the evacuator 24 for the outlet of the surplus air.

Figure 12:
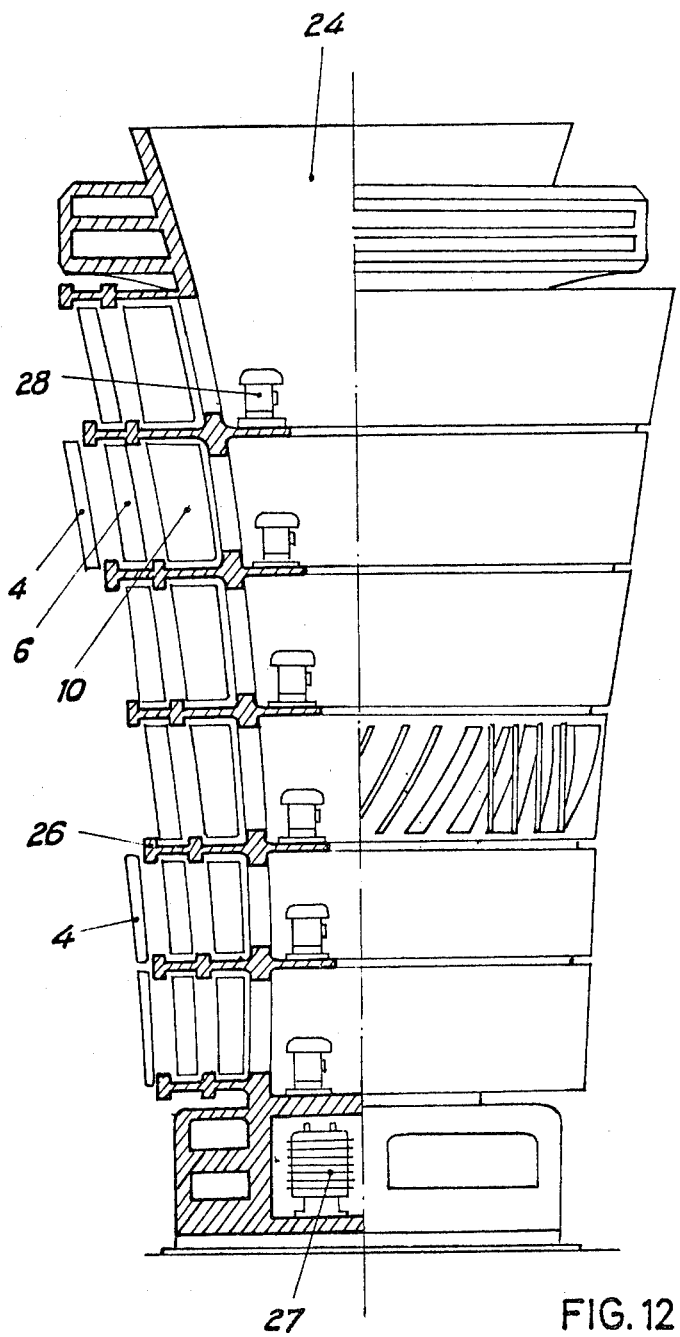
FIG. 12 is an elevation view, partially in section, of a further wind tower according to the invention.

In FIG. 12, there is shown a tower having an inside structure of plural independent floors, and there is shown the location of the intermediate vanes 6 of the turbine 5 and the outside vanes 4 of the deflector 1, as well as the rolling system 26 which may be, as described above, rollers, rails, linear electromagnets, friction devices, etc. On the base of the tower there is arranged a high voltage transformer 27, and on each floor there are arranged alternators or dynamos (generators) 28 with speed regulators.

Figure 13:
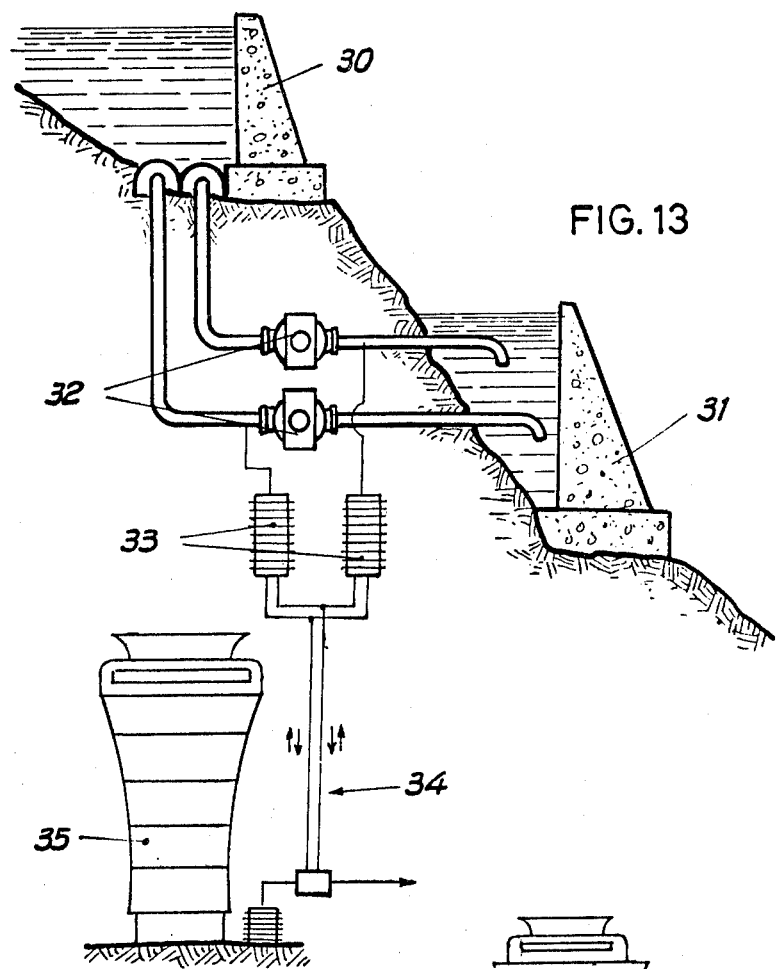
FIG. 13 is a schematic view of a hydro system employing a tower according to the invention.

The tower may be used with a system of two dams with a low or a high volume of storage. There is represented in FIG. 13 an upper dam 30, a lower dam 31, an arrangement of returnable turbines or suitable pumps 32, transformers 33, connection conductors 34, and a tower 35. In a like manner, in FIG. 14 there is shown a tower 36, pump 37, tank 38, and a supply of subsurface water 39. This system only requires for its operation a minimum quantity of water to produce electrical energy from the tower 35 or 36 to send water from the lower reservoir 31 or 39 to the upper one 30 or 38.

Thus, the hydro system includes the following components:

(a) Two dams at different levels, with a very low volume or hydrolysis and storage of hydrogen.

(b) Returnable turbine or turbines or suitable water pumps or steam boilers fed by hydrogen.

(c) Voltage transformers.

(d) Pressure piping or tanks for hydrogen.

(e) An energetic tower.

The system allows the utilization of any place for the storage of the necessary low volume of water by connecting the two places of storage with pressure piping which conducts the water to the dam with the lower level. By providing returnable turbines or pumps, with the energy from the tower, the water is pumped to the dam at the higher level in order to store the energetic surplus, and by repeating the cycle without interruption hydrogen is stored in suitable tanks.

The energy generation tower, with or without regulation dams, may be used in desert locations to pump subsurface waters at a very low cost and without any limitation of power. The tower, with power cyclone converters with power, diameter, height and number in accordance with the particular needs, may be constructed at the suitable emplacement to provide power from the minimum value desired up to the maximum permitted by technological limitations.

Figure 14:
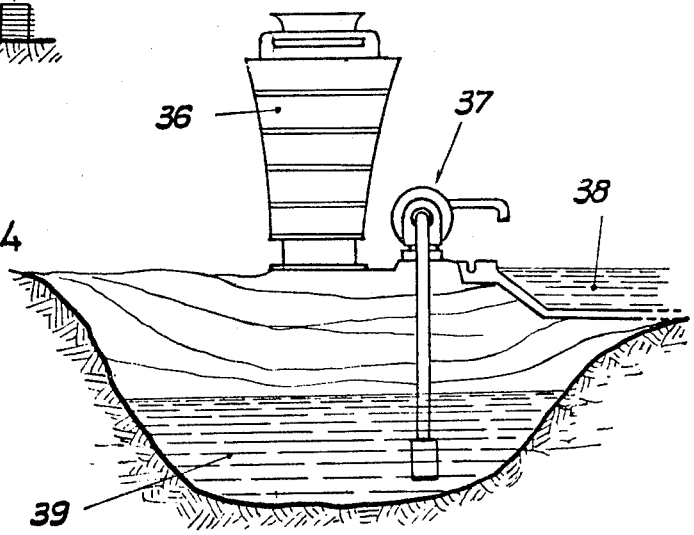
FIG. 14 is a schematic view of a tower according to the invention employed for the extraction of subsurface waters.

In FIG. 14, the cyclone tower obtains water from the subsurface in zones where there are provided electrical networks. The number and the size of the towers, which may be located on coastal zones, deserts, steppes, mountain ranges and other strategic places, is unlimited.

The system is especially useful, in view of its low cost for installation and production, for countries which have no sources of energy, for example, uranium, coal or oil. The mixed hydro or hydrogen system permits the liberation of all hydraulic reserves.

I claim:

1. A system for obtaining and regulating energy from fluid currents, such as wind air currents, said system comprising:

a generally circular outer deflector supported for circumferential rotation, said deflector including first and second groups of circumferentially spaced deflector vanes oriented such that a fluid current directed onto said deflector vanes will orient said deflector with a circumferential space between said first and second groups of vanes facing said current said deflector being for deflecting and directing said currents in one specific direction for powering said system;

a generally circular intermediate turbine supported for circumferential rotation coaxially within said deflector, said turbine including a plurality of turbine vanes having a varying vertical and horizontal angular orientation along their surface to receive said current which is directed in said one specific direction by said deflector to cause rotation of said turbine in a first direction, whereby said current will be deflected inwardly and upwardly of said turbine; and a generally circular inner diffuser supported for circumferential rotation coaxially within said turbine, said diffuser including a plurality of diffuser vanes generally angularly oriented opposite to the orientation of said turbine vanes to receive said current to cause rotation of said diffuser in a second direction opposite to said first direction and said current being directed inward and upward therefrom to be expelled coaxially out the top of said system.

2. A system as claimed in claim 1, wherein said deflector further includes first and second axially spaced circular rings, said first and second groups of deflector vanes extending between and being fixed at opposite ends thereof to said first and second rings.

3. A system as claimed in claim 1, wherein said turbine further includes first and second axially spaced circular rings, said turbine vanes extending between and being fixed at opposite ends thereof to said first and second rings, said turbine vanes being equally circumferentially spaced.

4. A system as claimed in claim 1, wherein said diffuser further includes first and second axially spaced circular rings, said diffuser vanes extending between and being fixed at opposite ends thereof to said first and second rings, said diffuser vanes being equally circumferentially spaced.

5. A tower comprising plural vertically spaced systems as claimed in claim 1.

* * * * *